USO05737809A

United States Patent [19]
Driver

[11] Patent Number: 5,737,809
[45] Date of Patent: Apr. 14, 1998

[54] LEAD ATTACHMENT DEVICE

[76] Inventor: Melvin B. Driver, 23, The Green, Caddington, Bedfordshire, Great Britain, LU1 4HF

[21] Appl. No.: 795,415

[22] Filed: Feb. 4, 1997

[30] Foreign Application Priority Data

Feb. 10, 1996 [GB] United Kingdom ............... 9602732

[51] Int. Cl.⁶ .................................................. A44B 13/00
[52] U.S. Cl. ...................... 24/600.7; 24/600.6; 24/601.2
[58] Field of Search ............................ 24/600.7, 600.6, 24/600.5, 600.4, 601.2, 600.8

[56] References Cited

U.S. PATENT DOCUMENTS

| 9,527 | 1/1853 | Covert | 24/600.7 |
|---|---|---|---|
| 461,646 | 10/1891 | Smith | 24/600.7 |
| 712,955 | 11/1902 | Parsley | 24/600.7 |
| 1,250,596 | 12/1917 | Kuhns | 24/600.7 |
| 1,561,952 | 11/1925 | Staples | 24/600.7 |
| 4,644,611 | 2/1987 | Tanaka . | |
| 4,665,592 | 5/1987 | Kasai | 24/601.2 |
| 4,689,860 | 9/1987 | Suchowski | 2/600.7 |
| 5,297,321 | 3/1994 | Murai . | |

FOREIGN PATENT DOCUMENTS

| 0 300 660 | 1/1989 | European Pat. Off. . |
|---|---|---|
| 1351209 | 4/1974 | United Kingdom . |
| 1368427 | 9/1974 | United Kingdom . |
| 2055419 | 3/1981 | United Kingdom . |

*Primary Examiner*—Victor N. Sakran
*Attorney, Agent, or Firm*—Locke Reynolds

[57] ABSTRACT

An anchorage device for use in coupling a line/leash/lead to a requisite anchorage location, comprising a first structural component (2) providing a connection location (5) for coupling the device with a line/leash/lead, and a hook like formation (3) for enabling engagement connection of the device to a desired connection location, a second structural component (9) providing a latch element operationally associated with the first component for controlling the opening and closure of the hook like formation, and a third structural component (19) adapted for engagement with said first and second structural components (2,9) in such manner that the second structural component (9) is retained in its operational position relative to said first structural component (2) by snap fitting inter engagement of the first and third components (2,19).

15 Claims, 2 Drawing Sheets

LEAD ATTACHMENT DEVICE

This invention is relates to the attachment of leads, cords or similar to an anchoage.

By the term anchorage is contemplated a fixed anchorage such as, for example, would be involved in coupling a line to a ring that is itself mounted from a fixed position, or an anchorage which is essentially movable as is the case where it is desired to attach a movement restricting line to an animal i.e., a dog lead to a collar worn by a dog.

Various constructional forms of attachment are known in relation to the coupling of an end of a dog lead to an attachment location provided upon a dog collar/harness or the like in such manner that a person holding the lead is able to control the freedom of movement of the dog.

It is an object of the present invention to provide an improved construction for such an anchorage.

Broadly according to the invention there is provided an anchorage device for use in coupling a line/leash/lead to a requisite anchorage location characterised in that all structural components thereof are held in their operational position by snap action interlocking forces.

In accordance with a further aspect of the invention there is provided an anchorage device for use in coupling a line/leash/lead to a requisite anchorage location, comprising a first structural component providing a connection location for coupling the device with a line/leash/lead, and a hook like means for enabling engagement connection of the device to a desired connection location, a second structural component providing a latch element operationally associated with the first component for controlling the opening and closure of the hook like means, and a third structural component adapted for engagement with said first and second structural components in such manner that the second structural component is retained in its operational position relative to said first structural component by snap fitting inter engagement of the first and third components.

Preferably, all said components are formed of plastics material.

For a better understanding of the invention and to show how to carry the same into effect reference will now be made to the accompanying drawing in which.

Figure 1:
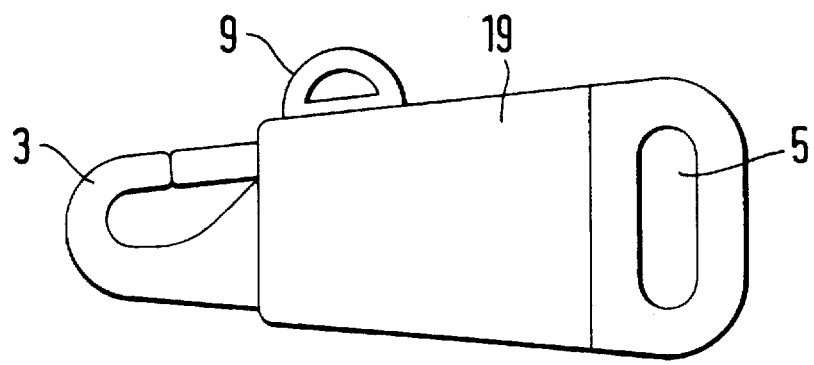
FIG. 1 is a side view of a latching device incorporating the concepts of the invention.
Figure 2:
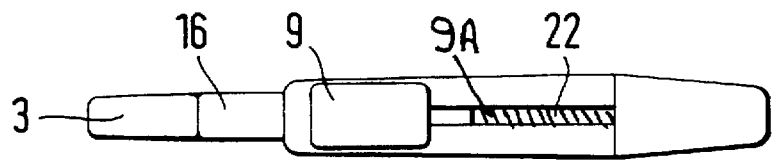
FIG. 2 is a elevation view of the device shown in FIG. 1.
Figure 3:
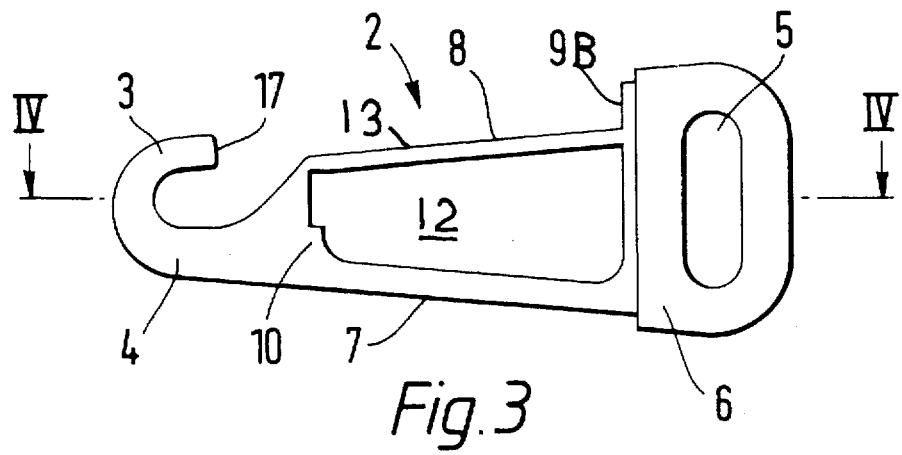
FIG. 3 is an elevation of a detail of the device shown in FIGS. 1 and 2, the elevation of FIG. 3 corresponding to the elevation of FIG. 1.
Figure 8:
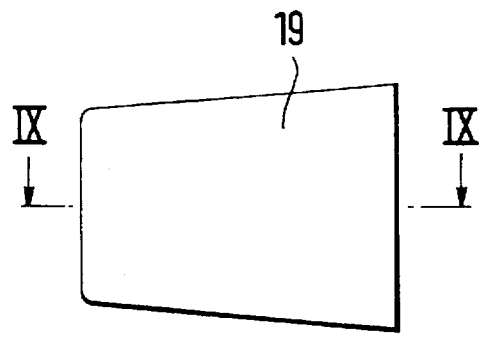
FIG. 8 is a side view of a further detail of the device of the FIGS. 1 and 2.
Figure 9:
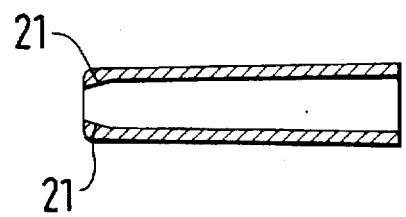
Figure 10:
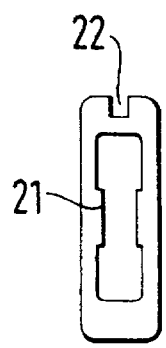
Figure 11:
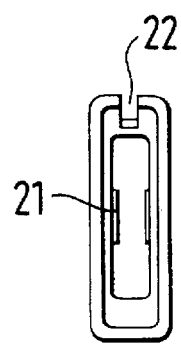
Figure 12:
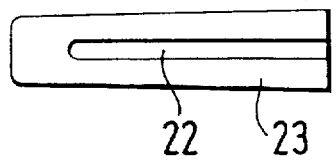

FIG. 9 is a sectional view of the detail of FIG. 8 on the line IX—IX of FIG. 8; and FIG. 10, 11 and 12, are elevations of the detail of FIG. 8, Referring now to FIGS. 1 to 3 the device shown therein includes a main component 2 having a hook formation 3 at one end 4 and an elongate opening 5 at the other end 6. This elongate opening 5 is intended to receive a dog leash/strap/lead (not shown) that is intended to be permanently connected to said other end 6 of the latching device of the invention.

The lowermost surface 7 of the component 2 is inclined upwardly as seen in FIG. 3 terminating at a curved part forming a shoulder 10. The corresponding uppermost surface 8 is inclined downwardly as is seen in FIG. 3 to provide as will be discussed later a guide surface for a latching component 9 (FIGS. 1/2). The end of the uppermost surface 8 adjacent the end 6 is located downwardly at of the overall length of the end 6 of the main component to provide an abutment shoulder 9A.

Figure 4:
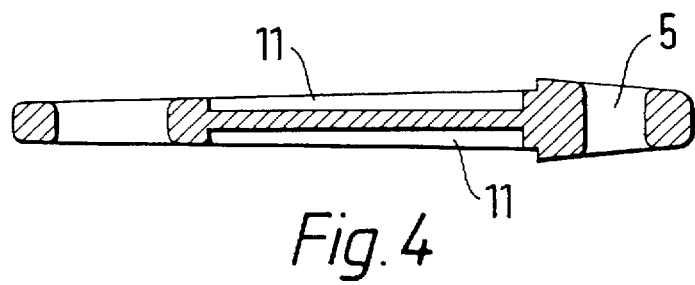
FIG. 4 is a section along the line VI—VI of FIG. 3.

The two side walls 11 of the main component are recessed as may be seen in the section shown in FIG. 4 to provide recessed regions 12 which are effective to define a shoulder 13 region along each edge region of the uppermost surface 8.

Figure 5:
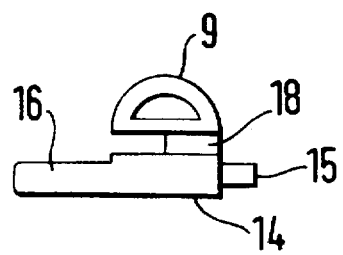
FIG. 5 is a side elevation of a detail of the device of FIG. 1.
Figure 6:
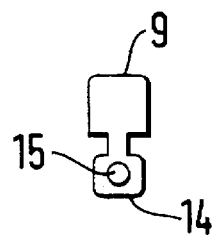
FIG. 6 is a plan view of the detail of FIG. 5.
Figure 7:
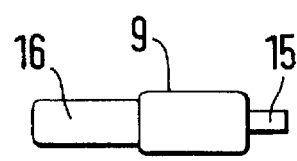
FIG. 7 is an end view of the detail of FIG. 6.

The latching component 9 is illustrated in FIGS. 5, 6 and 7, and includes a rectangular base part 14 which terminates at one end in a short cylindrical part 15 which acts as a location peg for a spring (not shown) and at its other end in a second cylindrical part 16 which is intended to abut the free end 17 of the hook formation thereby to provide the actual means controlling the opening and closure of the hook formation 3.

A short rectangular cross section rib 18 upstands from the base part and this mounts a thumb operable part 19 (to be discussed hereinafter).

It is intended that the latching component 9 should slidably rest upon the upper surface 8. One end of a spring 9A of which only a fragment is shown is engaged over the peg 15 with the other end bearing against the shoulder 9B. The spring can be a compression spring or any other suitable means for resiliently loading the latching component to its hook formation closing position.

The operational relationship between the slide component and the hook formation is indicated in FIG. 1.

The latching component 9 is held in place by means of a cover component 19 which is illustrated in FIGS. 8 to 12.

The cover component 19 includes a hollow elongate formation having side walls 20 defining a generally rectangular cross section interior slightly tapered in the lengthwise direction of the cover component. Two centrally located inwardly facing latch ribs 21 are located at the smaller end of the cover component. An elongate longitudinally directed slot 22 is provided along one longer outer surface 23 of the cover component. It is intended that this slot should be engaged by the upstanding rib 18 of the latching component 9 whereby the walls of the slot 22 provide a guide slot for the upstanding rib 18 of the latching component 9.

The cover component 19 is located in position by lengthwise sliding the cover component over the hook formation 3 in a direction towards the other end of the main component 2.

The relative dimensions of the main component 2 and the cover component 19 are such that the larger end of the cover component will pass over the hook formation to allow the slot 22 therein to engage with the rib 18 thereby to allow the cover component to be advanced until the latter locate with the other end 6 of the main component 2. The relatively free movement between the cover component 19 and the main component continues until the smaller end of the cover component i.e, the end having the latching ribs 22, brings these ribs 22 into contact with the non-recessed part of the main component immediately adjacent to the recessing of the component walls. During this part of the movement the walls of the cover component are slightly sprung outwards by the ribs 21 moving over the sides of the main component and as soon as the ribs reach the place where the recessing region commences side walls of the cover component are enabled automatically to restore to their undistorted position whereby the ribs 22 effectively spring back to their initial relative separation producing a snap action effect. The result of the snap action movement is that the cover component is effectively locked against subsequent removal from the main component.

It will be noted that the latching device incoporates, in addition to the latch component spring merely three components, and that these three components are retained in their operational positions solely by the locking action achieved by the snapping over of the ribs 22 into the recessed regions 12 of the main component.

In other words, the structure of the device of the invention does not require the use of screws or other securing means such as adhesives.

The components are conveniently formed from plastics material such as that known as Acetal.

In use the device is effectively permanently connected to the requisite lead of whatever form considered necessary.

It will be appreciated that the resilient loading can be by what ever means thought convenient.

Also the position of the slide component can be such that the use of a spring is eliminated with the operation of the device relying upon the tightness of fit to retain the slide component in its hook closed position.

The connection with the dog collar merely requires retraction of the catch component by means of a thumb engagement therewith against the spring loading thereof to open the mouth of the hook formation and then to engage the hook with a ring or the like provided on the collar. After which the latch component is released to close the mouth of the hook formation thereby to firmly connect the device with the ring.

I claim:

1. A lead attachment device for use at one end of a lead, the attachment device comprising:

a first component having a first end including an opening for receiving a loop of a lead, an intermediate portion including a laterally recessed region, and a second end including a hook having a tip projecting toward the intermediate portion, a second component having a first end confronting the tip of the hook, a second end directed toward the first component first end, a projection intermediate the second component first and second ends to permit manipulation of the location of the second component relative to the first component, and a biasing element biasing the second component first end into contact with the first component hook tip, and a third component enveloping the first component intermediate portion, having an upper surface including a slot receiving the second component projection, and having an inwardly projecting tang engaging the laterally recessed region of the first component to retain the first, second and third components in cooperative engagement.

2. A lead attachment device in accordance with claim 1 wherein the first component first end includes a peripheral shoulder and the third component includes an edge mating with the peripheral shoulder so that the outside surface of the third component is substantially smoothly continuous with the first component first end.

3. A lead attachment device in accordance with claim 1 wherein the first component laterally recessed region comprises a pair of laterally inset surfaces bounded by a step, a forward portion of the step adapted to engage the inwardly projecting tang of the third component.

4. A lead attachment device in accordance with claim 3 wherein an upper margin of the first component laterally recessed region includes a shoulder defining a glide surface for sliding contact with the second component.

5. A lead attachment device in accordance with claim 4 further comprising an abutment at one end of the glide surface defining shoulder, the biasing element comprising a coil spring confined between the abutment and the second component second end.

6. A lead attachment device in accordance with claim 1 wherein the second component includes an intermediate rectangular portion and the second component second end includes a peg adapted to engage the biasing element.

7. A lead attachment device in accordance with claim 1 wherein the second component projection includes an upstanding rib portion extending through the slot of the third component and an enlarged thumb operable portion confined outside the third component and facilitating movement of the second component.

8. A lead attachment device in accordance with claim 1 wherein the inwardly projecting tang is situated at a forward margin of the third component.

9. A lead attachment device for use at one end of a lead, the attachment device comprising:

a structural component having a first end including an opening for receiving a loop of a lead, an intermediate portion including a first snap interlocking feature, and a second end including a hook having a tip projecting toward the intermediate portion, a latching pin having a first end confronting the tip of the hook, a projection permitting manipulation of the location of the latching pin relative to the first component, and a biasing element biasing the latching pin first end into contact with the first component hook tip, and a covering component enveloping the structural component intermediate portion, having an upper surface including a slot receiving the latching pin projection, and having a second snap interlocking feature for engagement with the first snap interlocking feature to retain the structural component, latching pin and covering component in cooperative engagement.

10. A lead attachment device according to claim 9 wherein the first snap interlocking feature comprises a pair of lateral recesses in the intermediate portion of the structural component, and the second snap interlocking feature comprises a pair of inwardly projecting tangs situated adjacent a forward end of the covering component to be received in the lateral recesses.

11. A lead attachment device according to claim 9 wherein the structural component first end includes a peripheral shoulder and the covering component includes an edge mating with the peripheral shoulder so that the outside surface of the covering component is substantially smoothly continuous with the structural component first end.

12. A lead attachment device according to claim 9 wherein an upper margin of the structural component includes a shoulder defining a glide surface for sliding contact with the latching pin, and an abutment at one end of the glide surface defining shoulder, the biasing element comprising a compression spring confined between the abutment and the latching pin.

13. A lead attachment device according to claim 9 wherein the latching pin includes an intermediate rectangular portion, a second end including a peg engaging the biasing element, an upstanding rib portion extending through the slot of the covering component, and an enlarged thumb operable portion confined outside the covering component to facilitate movement of the latching pin.

14. A lead attachment device for use at one end of a lead, the attachment device comprising:

a structural component having a first end including an opening for receiving a loop of a lead, an intermediate portion including a pair of lateral recesses forming a first snap interlocking feature, a shoulder defining a glide surface, an abutment at one end of the glide surface, and a second end including a hook having a tip projecting toward the intermediate portion, a latching pin having a first end confronting the tip of the hook, an upstanding rib portion terminating in an enlarged thumb operable portion facilitating manual movement of the latching pin relative to the first component, and a compression spring confined between the abutment at one end of the glide surface and the latching pin for biasing the latching pin first end into contact with the first component hook tip, and a covering component enveloping the structural component intermediate portion, having an upper surface including a slot receiving the upstanding rib portion of the latching pin so that the enlarged thumb operable portion is confined outside the covering component, and having a pair of inwardly projecting tangs situated adjacent a forward end of the covering component forming a second snap interlocking feature for engagement with the lateral recesses forming the first snap interlocking feature to retain the structural component, latching pin and covering component in cooperative engagement.

15. A lead attachment device according to claim 14 wherein the structural component first end includes a peripheral shoulder and the covering component includes an edge mating with the peripheral shoulder so that the outside surface of the covering component is substantially smoothly continuous with the structural component first end when the first and second snap interlocking features are engaged with each other.

* * * * *